US006988121B1

(12) United States Patent
Tremblay et al.

(10) Patent No.: US 6,988,121 B1
(45) Date of Patent: *Jan. 17, 2006

(54) EFFICIENT IMPLEMENTATION OF MULTIPRECISION ARITHMETIC

(75) Inventors: Marc Tremblay, Menlo Park, CA (US); Chandramouli Banerjee, Fremont, CA (US)

(73) Assignee: Sun Microsystems, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/668,652

(22) Filed: Sep. 23, 2003

Related U.S. Application Data (63) Continuation of application No. 09/411,469, filed on Oct. 1, 1999, now Pat. No. 6,625,634.

(51) Int. Cl.
*G06F 7/50* (2006.01)
(52) U.S. Cl. .................................... 708/670; 708/710
(58) Field of Classification Search ............... 708/518, 708/670, 700, 701, 702, 703, 704, 706–714
See application file for complete search history.

(56) References Cited

U.S. PATENT DOCUMENTS

| 4,893,267 | A | * | 1/1990 | Alsup et al. ................ 708/518 |
| 5,132,921 | A | * | 7/1992 | Kelley et al. ............... 708/701 |
| 5,574,939 | A | | 11/1996 | Keckler et al. |
| 5,657,291 | A | | 8/1997 | Podlesny et al. |
| 5,721,868 | A | | 2/1998 | Yung et al. |
| 5,742,782 | A | | 4/1998 | Ito et al. |
| 5,761,475 | A | | 6/1998 | Yung et al. |
| 5,764,943 | A | | 6/1998 | Wechsler |
| 5,778,248 | A | | 7/1998 | Leung |
| 5,959,874 | A | * | 9/1999 | Lin et al. .................... 708/700 |
| 6,263,424 | B1 | * | 7/2001 | Tran et al. ................... 712/221 |
| 6,408,320 | B1 | * | 6/2002 | Shiell ......................... 708/518 |

FOREIGN PATENT DOCUMENTS

| EP | 0395348 A | 10/1990 |
| EP | 0672681 A1 | 12/1994 |

OTHER PUBLICATIONS

Piepho, R.S., et al; "A Comparison of RISC Architectures" *IEEE Micro*, IEEE Inc., New York, U.S. vol. 9, No. 4, Aug. 1, 1989, pp. 51-62.

(Continued)

*Primary Examiner*—Chuong D Ngo
(74) *Attorney, Agent, or Firm*—Zagorin O'Brien Graham LLP (57) ABSTRACT

The present invention provides an efficient implementation of multiprecision arithmetic, such as for a microprocessor. For example, an implementation of multiprecision arithmetic is provided that eliminates condition codes, such as condition codes for a carry bit and a borrow bit, and eliminates an add-with-carry instruction for multiprecision addition and a subtract-with-borrow instruction for multiprecision subtraction. In one embodiment, a method includes separately performing a first one or more arithmetic operations and a second one or more arithmetic operations. The second arithmetic operations indicate if the first arithmetic operations cause a carry condition or if the first arithmetic operations cause a borrow condition. The one or more results of the first and second arithmetic operations are then provided. The first and second arithmetic operations can be executed in parallel on a microprocessor.

24 Claims, 6 Drawing Sheets

OTHER PUBLICATIONS

"Multiple Queued Condition Codes" *IBM Technical Disclosure Bulletin*, IBM Corp., New York, U.S., vol. 31, No. 2, Jul. 1998, pp. 294-296.

M. Fillo et al.: "The M-Machine Multicomputer;" Proceedings of the Annual International Symposium on Microarchitecture, U.S., Los Alamitos, IEEE Comp. Soc. Press, vol. SYMP. 28, 1995, pp. 146-156, XP000585356 ISBN: 0-8186-7349-4.

M. Berekovic et al.: "Hardware Realization of a Java Virtual Machine For High Performance Multimedia Applications;" 1997 IEEE Workshop on Signal Processing Systems. SIPS 97 Design and Implementation Formerly VLSI Signal Processing, pp. 479-488, XP002139288, 1997, New York, NY, USA, IEEE.

S. W. Keckler et al.: "Processor Coupling: Integrating Compile Time and Runtime Scheduling for Parallelism;" Proceedings of the Annual International Symposium on Computer Architecture, U.S., New York, IEEE, vol. SYMP. 19, 1992, pp. 202-213, XP000325804 ISBN: 0-89791-510-6.

* cited by examiner (PRIOR ART)
FIG. 1

EFFICIENT IMPLEMENTATION OF MULTIPRECISION ARITHMETIC

CROSS-REFERENCE TO RELATED APPLICATION(S)

This application is a continuation of U.S. patent application Ser. No. 09/411,469, filed Oct. 1, 1999, now U.S. Pat. No. 6,625,634 entitled "Efficient Implementation of Multiprecision Arithmetic" and naming Marc Tremblay and Chandramouli Banerjee as inventors.

BACKGROUND

1. Field of the Invention

The present invention relates generally to microprocessors, and more particularly, to an efficient implementation of multiprecision arithmetic.

2. Description of the Related Art

Reduced Instruction Set Computing (RISC) microprocessors are well-known. RISC microprocessors are characterized by a smaller number of instructions, which are relatively simple to decode, and by requiring that all arithmetic/logic operations be performed register-to-register. RISC instructions are generally of only one length (e.g., 32-bit instructions). RISC instruction execution is of the direct hard-wired type, as opposed to microcoding. There is a fixed instruction cycle time, and the instructions are defined to be relatively simple so that each instruction generally executes in one relatively short cycle.

Figure 1:
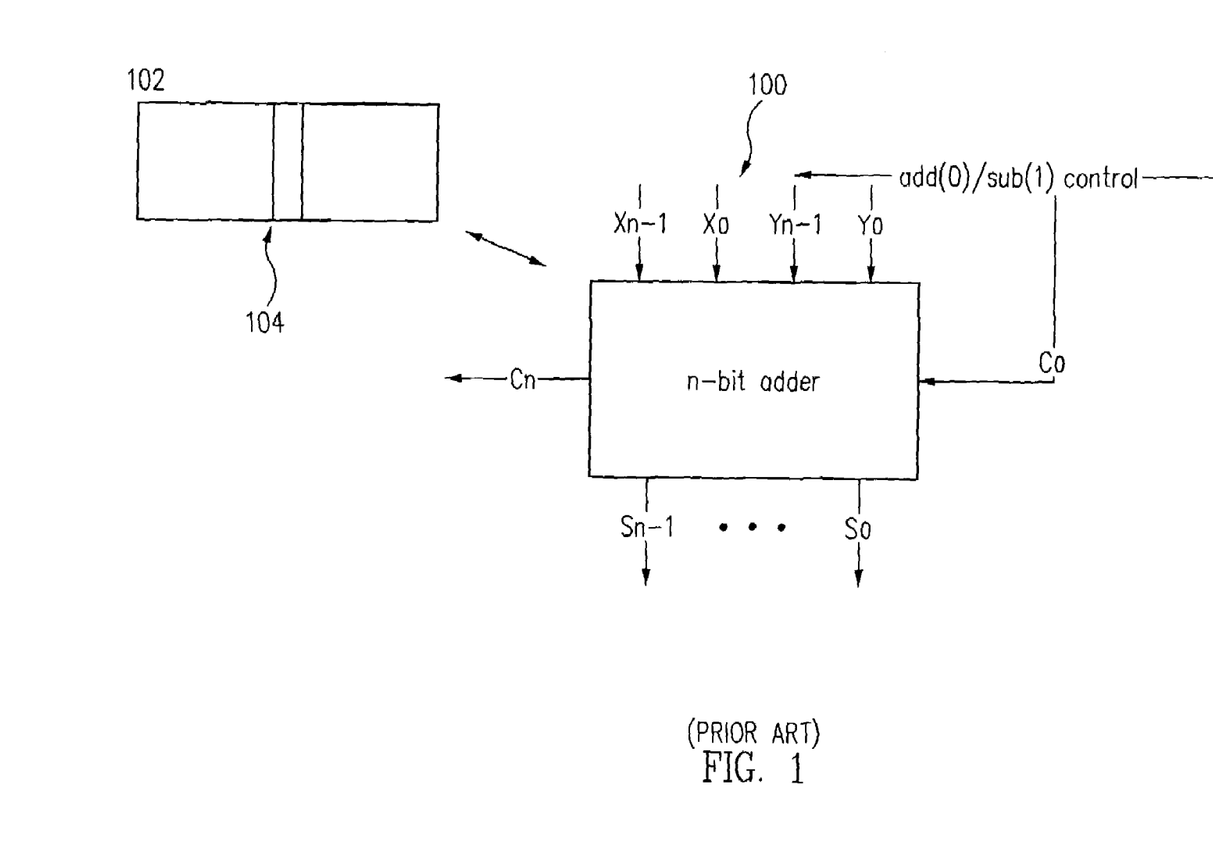
FIG. 1 is a prior art implementation of multiprecision arithmetic.

A RISC microprocessor typically includes an instruction for performing multiprecision arithmetic. However, a typical multiprecision add instruction or multiprecision subtract instruction is implemented using a condition code register. FIG. 1 illustrates an implementation of a multiprecision add operation in a typical microprocessor. FIG. 1 shows an n-bit adder 100 that can perform an addition operation and a subtraction operation. The add/sub control wire is set to zero for addition, which allows for the Y vector to be applied unchanged to one of the adder inputs along with a carry-in signal, $C_o$. When the add/sub control wire is set to one, indicating subtraction, the Y vector is 1's complemented (that is bit complemented), and $C_o$ is set to 1 to complete the 2's complementation of Y. When adding unsigned numbers, the carry-out $C_n$ serves as the overflow indicator. FIG. 1 also shows a condition code register 102 that includes a carry bit 104 which functions as a condition code flag. The condition code flag provides the carry-out signal $C_n$ of the n-bit adder 100. The condition code flag is set to 1 if a carry-out results from an add operation, otherwise the condition code flag is set to 0. Additionally, the condition code flag is set to 1 if no carry-out results from a subtract operation, otherwise the condition code flag is set to 0.

An important aspect of condition code flags generally is the role of the C (Carry) flag in performing multiprecision (multiple-precision) arithmetic. For example, consider adding two operands, X and Y, each occupying several words in memory. The addition can be performed by a program loop that adds individual words in successive iterations. The C flag must be preserved from one iteration to the next in order to propagate the carries through the complete addition operation.

However, it is desirable to eliminate condition codes in the architecture of a microprocessor.

SUMMARY

An efficient implementation of multiprecision (multiple-precision) arithmetic is provided. For example, an implementation of multiprecision arithmetic is provided that eliminates condition codes, such as condition codes for a carry bit and a borrow bit, and eliminates an add-with-carry instruction for multiprecision addition and a subtract-with-borrow instruction for multiprecision subtraction. In one embodiment, the present invention provides a cost-effective and high performance implementation of multiprecision arithmetic execution on a microprocessor.

In one embodiment, a method includes separately performing a first one or more arithmetic operations and a second one or more arithmetic operations. The second arithmetic operations indicate if the first arithmetic operations cause a carry condition or if the first arithmetic operations cause a borrow condition. The one or more results of the first and second arithmetic operations are then provided.

Other aspects and advantages of the present invention will become apparent from the following detailed description and accompanying drawings.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The present invention provides an efficient implementation of multiprecision (multiple precision) arithmetic. In one embodiment, a generate carry instruction for a microprocessor is provided, in which executing the generate carry instruction on the microprocessor generates a carry, if any, for an add of a first operand and a second operand such that the requirement of a dedicated condition code register for a carry bit can be eliminated. The generate carry instruction can be executed in parallel on the microprocessor with an add instruction (e.g., a 32-bit add without carry operation) to advantageously provide multiprecision arithmetic, which eliminates the requirement of an add-with-carry instruction. Further, a generate borrow instruction can be similarly provided for an efficient implementation of multiprecision subtraction executed on the microprocessor.

Figure 2:
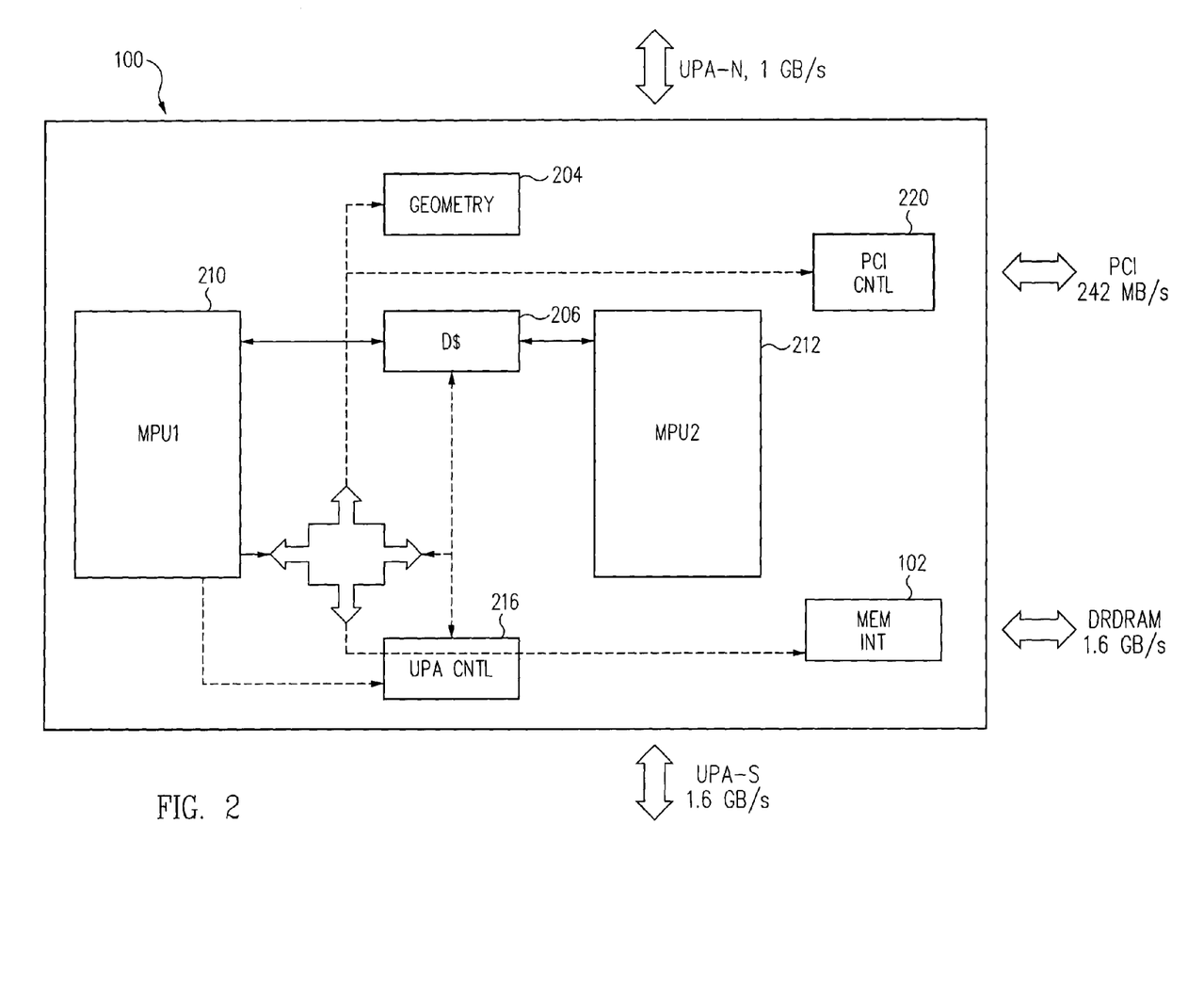
FIG. 2 is a schematic block diagram illustrating a single integrated circuit chip implementation of a processor in accordance with an embodiment of the present invention.

Referring to FIG. 2, a schematic block diagram illustrates a single integrated circuit chip implementation of a processor 200 that includes a memory interface 202, a geometry decompressor 204, two media processing units 210 and 212, a shared data cache 206, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include an UltraPort Architecture Interconnect (UPA) controller 216 and a peripheral component interconnect (PCI) controller 220. The illustrative memory interface 202 is a direct Rambus dynamic RAM (DRDRAM) controller. The shared data cache 206 is a dual-ported storage that is shared among the media processing units 210 and 212 with one port allocated to each media processing unit. The data cache 206 is four-way set associative, follows a write-back protocol, and supports hits in the fill buffer (not shown). The data cache 206 allows fast data sharing and eliminates the need for a complex, error-prone cache coherency protocol between the media processing units 210 and 212.

The UPA controller 216 is a custom interface that attains a suitable balance between high-performance computational and graphic subsystems. The UPA is a cache-coherent, processor-memory interconnect. The UPA attains several advantageous characteristics including a scaleable bandwidth through support of multiple bused interconnects for data and addresses, packets that are switched for improved bus utilization, higher bandwidth, and precise interrupt processing. The UPA performs low latency memory accesses with high throughput paths to memory. The UPA includes a buffered cross-bar memory interface for increased bandwidth and improved scaleability. The UPA supports high-performance graphics with two-cycle single-word writes on the 64-bit UPA interconnect. The UPA interconnect architecture utilizes point-to-point packet switched messages from a centralized system controller to maintain cache coherence. Packet switching improves bus bandwidth utilization by removing the latencies commonly associated with transaction-based designs.

The PCI controller 220 is used as the primary system I/O interface for connecting standard, high-volume, low-cost peripheral devices, although other standard interfaces may also be used. The PCI bus effectively transfers data among high bandwidth peripherals and low bandwidth peripherals, such as CD-ROM players, DVD players, and digital cameras.

Two media processing units 210 and 212 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 200 is an eight-wide machine with eight execution units for executing instructions. A typical "general-purpose" processing code has an instruction level parallelism of about two so that, on average, most (about six) of the eight execution units would be idle at any time. The illustrative processor 200 employs thread level parallelism and operates on two independent threads, possibly attaining twice the performance of a processor having the same resources and clock rate but utilizing traditional non-thread parallelism.

Thread level parallelism is particularly useful for Java™ applications which are bound to have multiple threads of execution. Java™ methods including "suspend", "resume", "sleep", and the like include effective support for threaded program code. In addition, Java™ class libraries are thread-safe to promote parallelism. Furthermore, the thread model of the processor 200 supports a dynamic compiler which runs as a separate thread using one media processing unit 210 while the second media processing unit 212 is used by the current application. In the illustrative system, the compiler applies optimizations based on "on-the-fly" profile feedback information while dynamically modifying the executing code to improve execution on each subsequent run. For example, a "garbage collector" may be executed on a first media processing unit 210, copying objects or gathering pointer information, while the application is executing on the other media processing unit 212.

Although the processor 200 shown in FIG. 2 includes two processing units on an integrated circuit chip, the architecture is highly scaleable so that one to several closely-coupled processors may be formed in a message-based coherent architecture and resident on the same die to process multiple threads of execution. Thus, in the processor 200, a limitation on the number of processors formed on a single die thus arises from capacity constraints of integrated circuit technology rather than from architectural constraints relating to the interactions and interconnections between processors.

Figure 3:
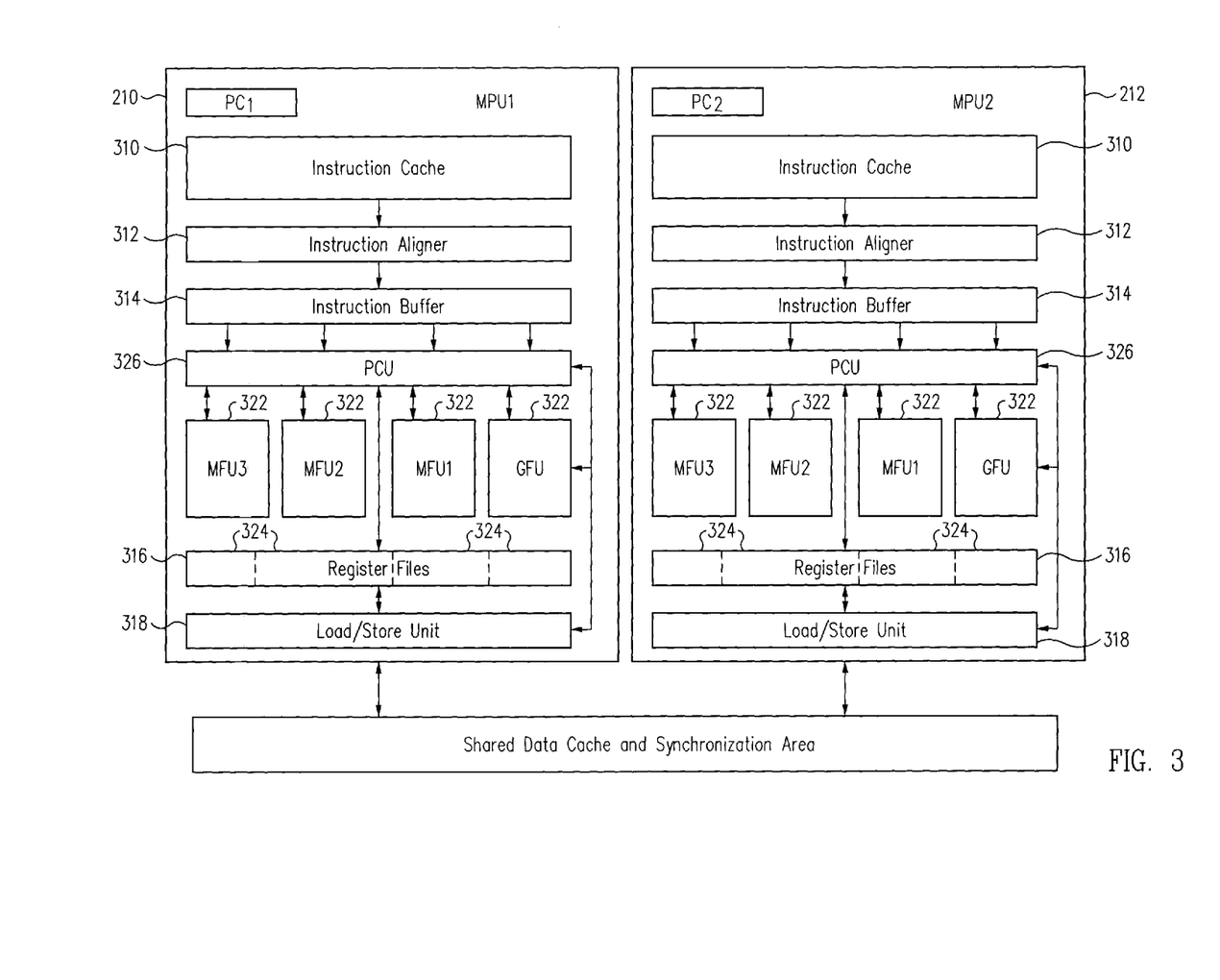
FIG. 3 is a schematic block diagram showing the core of the processor.

Referring to FIG. 3, a schematic block diagram shows the core of the processor 200. The media processing units 210 and 212 each include an instruction cache 310, an instruction aligner 312, an instruction buffer 314, a pipeline control unit 326, a split register file 316, a plurality of execution units, and a load/store unit 318. In the illustrative processor 200, the media processing units 210 and 212 use a plurality of execution units for executing instructions. The execution units for a media processing unit 210 include three media functional units (MFU) 322 and one general functional unit (GFU) 320. The media functional units 322 are multiple single-instruction-multiple-datapath (MSIMD) media functional units. Each of the media functional units 322 is capable of processing parallel 32-bit components. Various parallel 32-bit operations supply the single-instruction-multiple-datapath capability for the processor 200 including add, multiply-add, shift, compare, and the like. The media functional units 322 operate in combination as tightly-coupled digital signal processors (DSPs). Each media functional unit 322 has a separate and individual sub-instruction stream, but all three media functional units 322 execute synchronously so that the subinstructions progress lock-step through pipeline stages.

The general functional unit 320 is a RISC processor capable of executing arithmetic logic unit (ALU) operations, loads and stores, branches, and various specialized and esoteric functions such as parallel power operations, reciprocal squareroot operations, and many others. The general functional unit 320 supports less common parallel operations such as the parallel reciprocal square root instruction.

The illustrative instruction cache 310 has a 16 Kbyte capacity and includes hardware support to maintain coherence, allowing dynamic optimizations through self-modifying code. Software is used to indicate that the instruction storage is being modified when modifications occur. The 16K capacity is suitable for performing graphic loops, other multimedia tasks or processes, and general-purpose Java™ code. Coherency is maintained by hardware that supports write-through, non-allocating caching. Self-modifying code is supported through explicit use of "store-to-instruction-space" instructions store2i. Software uses the store2i instruction to maintain coherency with the instruction cache 310 so that the instruction caches 310 do not have to be snooped on every single store operation issued by the media processing unit 210.

The pipeline control unit 326 is connected between the instruction buffer 314 and the functional units and schedules the transfer of instructions to the functional units. The pipeline control unit 326 also receives status signals from the functional units and the load/store unit 318 and uses the status signals to perform several control functions. The pipeline control unit 326 maintains a scoreboard, generates stalls and bypass controls. The pipeline control unit 326 also generates traps and maintains special registers.

Each media processing unit 210 and 212 includes a split register file 316, a single logical register file including 128 thirty-two bit registers. The split register file 316 is split into a plurality of register file segments 324 to form a multi-ported structure that is replicated to reduce the integrated circuit die area and to reduce access time. A separate register file segment 324 is allocated to each of the media functional units 322 and the general functional unit 320. In the illustrative embodiment, each register file segment 324 has 128 32-bit registers. The first 96 registers (0–95) in the register file segment 324 are global registers. All functional units can write to the 96 global registers. The global registers are coherent across all functional units (MFU and GFU) so that any write operation to a global register by any functional unit is broadcast to all register file segments 324. Registers 96–127 in the register file segments 324 are local registers. Local registers allocated to a functional unit are not accessible or "visible" to other functional units.

The media processing units 210 and 212 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 320 and from zero to three instructions that execute in the media functional units (MFU) 322. A MFU instruction field within the VLIW instruction word includes an operation code (opcode) field, three source register (or immediate) fields, and one destination register field.

Instructions are executed in-order in the processor 200 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

To avoid software scheduling errors, the media processing units 210 and 212 are high-performance but simplified with respect to both compilation and execution. The media processing units 210 and 212 are most generally classified as a simple 2-scalar execution engine with full bypassing and hardware interlocks on load operations. The instructions include loads, stores, arithmetic and logic (ALU) instructions, and branch instructions so that scheduling for the processor 200 is essentially equivalent to scheduling for a simple 2-scalar execution engine for each of the two media processing units 210 and 212.

The processor 200 supports full bypasses between the first two execution units within the media processing unit 210 and 212 and has a scoreboard in the general functional unit 320 for load operations so that the compiler does not need to handle nondeterministic latencies due to cache misses. The processor 200 scoreboards long latency operations that are executed in the general functional unit 320, for example a reciprocal square-root operation, to simplify scheduling across execution units. The scoreboard (not shown) operates by tracking a record of an instruction packet or group from the time the instruction enters a functional unit until the instruction is finished and the result becomes available. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 320 or the first media functional unit 322, then the stall only endures until the result is available for intra-unit bypass. For the case of a load instruction that hits in the data cache 206, the stall may last only one cycle. If the referencing instruction is on the second or third media functional units 322, then the stall endures until the result reaches the writeback stage in the pipeline where the result is bypassed in transmission to the split register file 316.

The scoreboard automatically manages load delays that occur during a load hit. In an illustrative embodiment, all loads enter the scoreboard to simplify software scheduling and eliminate NOPs in the instruction stream.

The scoreboard is used to manage most interlocks between the general functional unit 320 and the media functional units 322. All loads and non-pipelined long-latency operations of the general functional unit 320 are scoreboarded. The long-latency operations include division idiv, fdiv instructions, reciprocal squareroot frecsqrt, precsqrt instructions, and power ppower instructions. None of the results of the media functional units 322 are scoreboarded. Non-scoreboarded results are available to subsequent operations on the functional unit that produces the results following the latency of the instruction.

The illustrative processor 200 has a rendering rate of over fifty million triangles per second without accounting for operating system overhead. Therefore, data feeding specifications of the processor 200 are far beyond the capabilities of cost-effective memory systems. Sufficient data bandwidth is achieved by rendering of compressed geometry using the geometry decompressor 204, an on-chip real-time geometry decompression engine. Data geometry is stored in main memory in a compressed format. At render time, the data geometry is fetched and decompressed in real-time on the integrated circuit of the processor 200. The geometry decompressor 204 advantageously saves memory space and memory transfer bandwidth. The compressed geometry uses an optimized generalized mesh structure that explicitly calls out most shared vertices between triangles, allowing the processor 200 to transform and light most vertices only once. In a typical compressed mesh, the triangle throughput of the transform-and-light stage is increased by a factor of four or more over the throughput for isolated triangles. For example, during processing of triangles, multiple vertices are operated upon in parallel so that the utilization rate of resources is high, achieving effective spatial software pipelining. Thus operations are overlapped in time by operating on several vertices simultaneously, rather than overlapping several loop iterations in time. For other types of applications with high instruction level parallelism, high trip count loops are software-pipelined so that most media functional units 322 are fully utilized.

Figure 4:
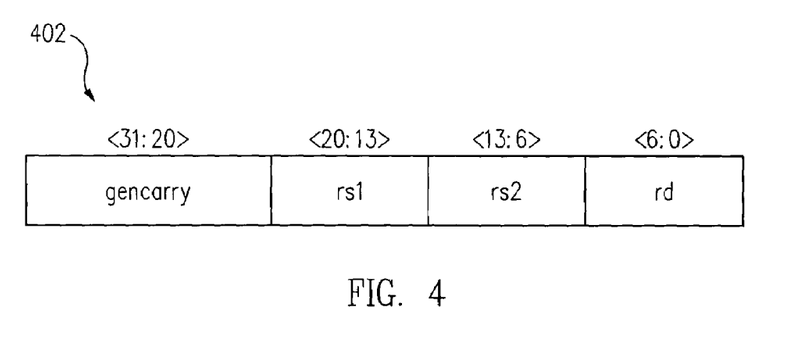
FIG. 4 shows a format of a generate carry instruction in accordance with one embodiment of the present invention.

FIG. 4 illustrates a generate carry instruction format 402 in accordance with one embodiment of the present invention. The generate carry instruction (gencarry) includes an 11-bit opcode in bits <31:20>, a first register specifier field (RS1) in bits <20:13>, a second register specifier field (RS2) in bits <13:6>, and a third register specifier field (RD) in bits <6:0>. For example, the first register specifier field designates a first operand, the second register specifier field designates a second operand, and a third register specifier field designates a register destination. Execution of the generate carry instruction on the microprocessor of FIG. 2 results in the carry bit, if any, of an addition of the first operand and the second operand being loaded or stored in the designated register destination. A generate borrow instruction can have a format similar to generate carry instruction format 402.

Figure 5:
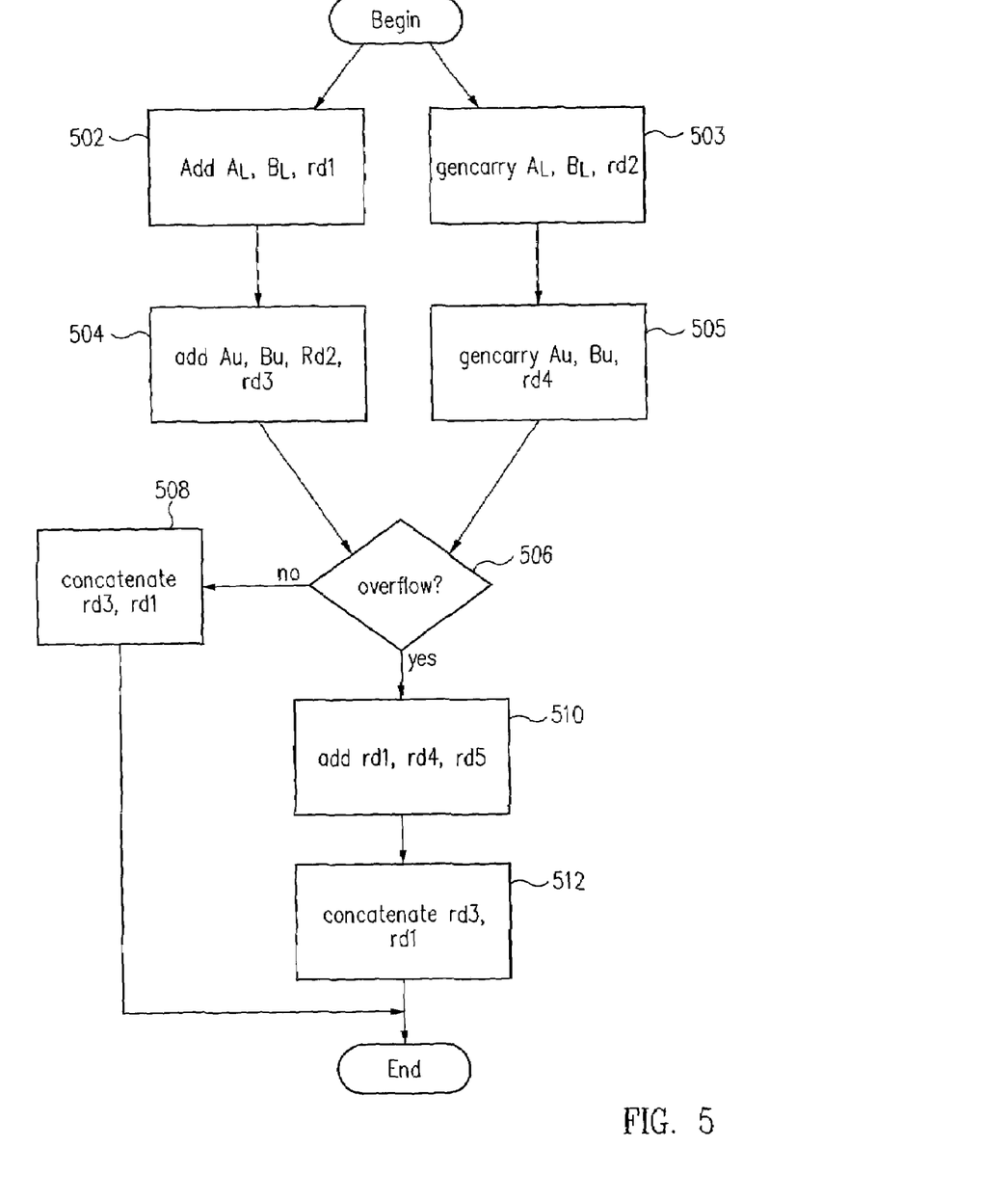
FIG. 5 is a functional diagram of the operation of the generate carry instruction of FIG. 4 in accordance with one embodiment of the present invention.

FIG. 5 is a functional diagram of the operation of a multiprecision addition using the generate carry instruction of FIG. 4 executed in parallel on the microprocessor of FIG. 2 in accordance with one embodiment of the present invention. In such an operation, the various instructions may be included within the same Very Long Instruction Word (VLIW) instruction packet. Gencarry 402 is an instruction that provides or stores, for example, a 1 in the designated register destination if an add of the first operand and the second operand results in a carry bit. Otherwise, the execution of gencarry 402 results in, for example, a 0 being stored in the designated register destination.

The 64-bit value A may be separated into $A_U$ and $A_L$ where $A_U$ represents the 32 more significant bits of the value A and $A_L$ represents the 32 less significant bits of the value A. Additionally, the 64-bit value B may be separated into $B_U$ and $B_L$ where $B_U$ represents the 32 more significant bits of the value B and $B_L$ represents the 32 less significant bits of the value B.

At stage 502, $A_L$ and $B_L$ are added using an add without carry operation. In parallel, at stage 503, a gencarry operation is executed to determine whether an overflow condition which would cause a carry bit to be set is present from an add of $A_L$ and $B_L$. The gencarry operation stores the result of the carry generation in a designated register destination, Rd2. At stage 504, a three-operand add operation is performed, in which $A_U$, $B_U$, and the result of the gencarry operation stored in Rd2 are added and stored in destination register Rd3. In parallel, at stage 505, a gencarry operation is executed to determine whether a carry bit results from an add of $A_U$, $B_U$. The result of the gencarry operation is stored in destination register Rd4. If there is not an overflow condition as determined at stage 506, then the result of the add operations of stages 502 and 504 are concatenated at stage 508 to provide the multiprecision addition of A and B. If there is an overflow condition from the addition of $A_U$ and $B_U$, which may be present when two large numbers are added, then an additional add operation is executed at stage 510 with the result of the add operation that is stored in register Rd1 and the result of the gencarry operation that is stored in register Rd4. The result of this add operation is stored in destination register Rd5. The result of the add operations of stages 504 and 506 are concatenated to provide the multiprecision addition of A and B at stage 512.

Accordingly, FIG. 5 illustrates the operation of the gencarry instruction used in combination with a conventional add (without carry) operation to provide multiprecision arithmetic for add operations. This embodiment advantageously eliminates the requirement of a dedicated condition code register. Moreover, this embodiment eliminates an add-with-carry instruction for multiprecision arithmetic, which typically requires a write port for the carry bit. It will be appreciated that in another embodiment of the invention, any or all of the instructions 502–506 may be executed serially on a single processor or functional unit.

One of ordinary skill in the art will appreciate that a generate borrow instruction can be similarly employed with a subtract (without borrow) instruction to provide similar advantages for multiprecision subtraction executed on the microprocessor of FIG. 2.

In one embodiment, in a multiple issue microprocessor such as the microprocessor of FIG. 2, the gencarry instruction can be compiled to execute as a parallel instruction in a Very Long Instruction Word (VLIW) packet. For example, a VLIW packet may include the following four instructions: sub(tract), genborrow, add(ition), and gencarry. The instruction pipeline of the Multi-Function Unit (MFU) includes the following stages:

F(etch) A(lign) D(ecode) X0(execute) X1X2X3 T(rap) W(riteback)

Where the instructions are executed in one cycle, the cycle occurring after the execute stage of the pipeline.

Figure 6:
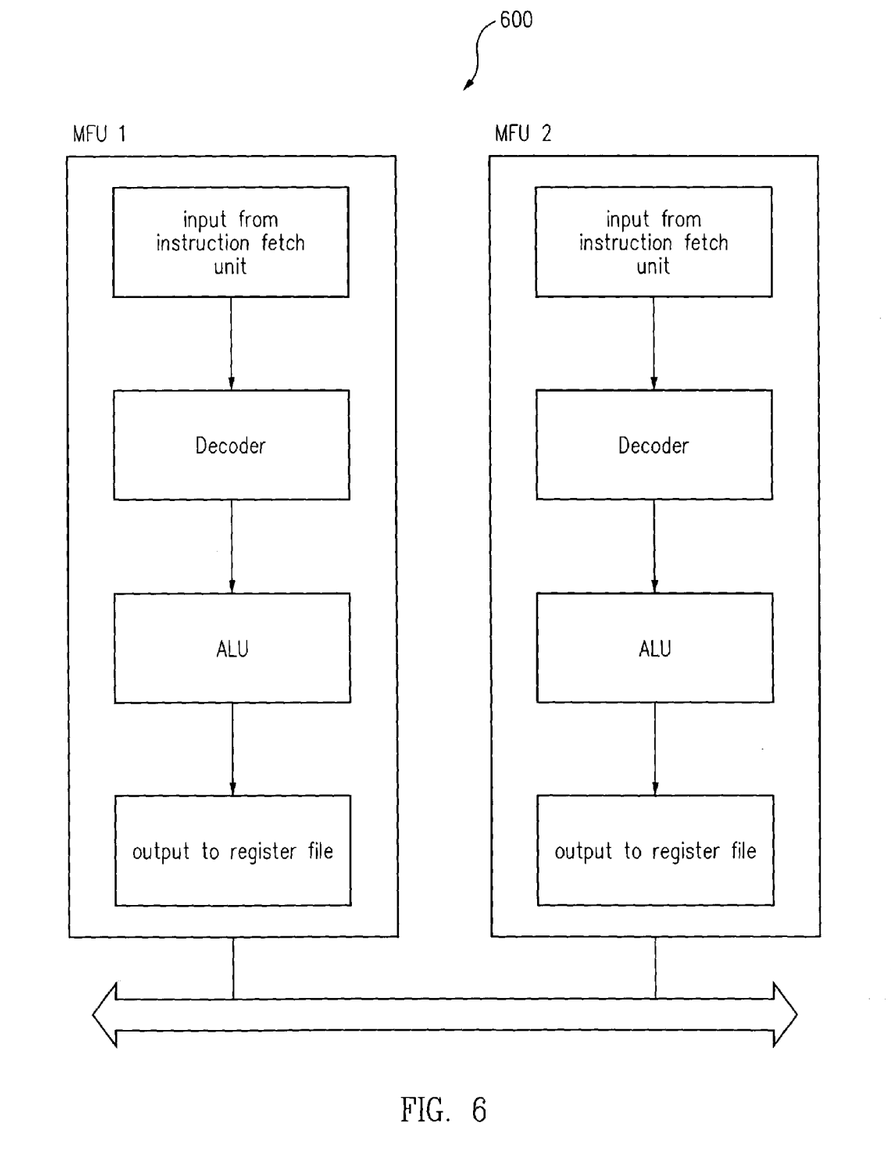
FIG. 6 is a block diagram of an implementation of the generate carry instruction of FIG. 4 in accordance with one embodiment of the present invention.

FIG. 6 is a block diagram of an implementation of the generate carry instruction of FIG. 3 executed on the microprocessor of FIG. 2 in accordance with one embodiment of the present invention. FIG. 6 shows a processor 600 that includes an MFU1 and an MFU2 in accordance with one embodiment of the present invention. MFU1 and MFU2 each include a decoder and an ALU (Arithmetic Logic Unit). Referring to MFU 1, the decoder receives input from the instruction fetch-unit, decodes the instruction, and passes the instruction to the ALU. The ALU includes circuitry for generating the carry bit from an add of a first operand and a second operand, and storing the carry result in a designated register destination. MFU2 can decode and execute an add (without carry) operation and output the result of that operation to a designated register destination.

One of ordinary skill in the art will recognize that there are various ways to implement the circuitry for performing the operation of the gencarry instruction or the genborrow instruction in a microprocessor, such as the microprocessor of FIG. 2.

Although particular embodiments of the present invention have been shown and described, it will be obvious to those skilled in the art that changes and modifications can be made without departing from the present invention in its broader aspects. The present invention is not limited by any particular processor architecture, the presence or structure of caches or memory, or the number of bits in any register or memory location. For example, the present invention can be applied to 32-bit add operations using a generate carry operation as well as to operations of other sizes, such as 64-bit add operations and 64-bit generate carry operations. Also, it will be apparent that the present invention can be applied to multiprecision subtraction, as discussed above. Also, it will be apparent that the present invention is not necessarily limited to multiple issue processors. Also, it will be apparent that the present invention is not necessarily limited to architectures having three registers per operation. Therefore, the appended claims are to encompass within their scope all such changes and modifications that fall within the true scope of the present invention.

What is claimed is:

1. A method comprising:
executing a first instruction to perform an addition type arithmetic operation on at least a first and second operands; and
executing a second instruction to indicate whether the addition type arithmetic operation causes a carry condition, wherein the second instruction includes a field that indicates a destination location for the carry condition indication.

2. The method of claim 1, wherein the first and second instructions are executed in parallel.

3. The method of claim 1, wherein the first instruction and the second instruction correspond to a very long instruction word packet (VLIW).

4. The method of claim 1, wherein the second instruction includes an opcode field, fields to indicate at least a first and second operands, and a destination field to indicate where to store the carry condition indication.

5. The method of claim 1 embodied in a computer program product that is encoded on one or more machine-readable media.

6. The method of claim 1 further comprising:
executing a third instruction to perform a subtraction type arithmetic operation on a third and fourth operands; and
executing a fourth instruction to indicate whether the subtraction type arithmetic operation causes a borrow condition, wherein the fourth instruction includes a field that indicates a destination location for the borrow condition indication.

7. The method of claim 6 further comprising employing the fourth instruction to determine whether an underflow occurs.

8. The method of claim 1 further comprising:
executing a third instruction to perform an addition type arithmetic operation on a third operand, fourth operand, and the result of the second instruction;
executing a fourth instruction to indicate whether the third instruction causes a carry condition, wherein the second instruction includes a field that indicates a destination location for the carry condition indication; and
using the carry condition indication from the fourth instruction to determine whether an overflow occurs from the third instruction,
wherein the first and third operands are respectively a lower and upper portions of a first multi-word value and the second and fourth operands are respectively a lower and upper portions of a second multi-word value.

9. The method of claim 8 further comprising:
if an overflow occurs, executing a fifth instruction to add the result of the fourth instruction to the result of the first instruction, and concatenating the result of the fifth instruction to the result of the third instruction; and
if the overflow does not occur, then concatenating the result of the first and third instructions.

10. A processor that supports a generate carry instruction separate from an addition type instruction and that includes a plurality of store units, wherein execution of an instance of the generate carry instruction causes the processor to store an indication of a carry condition generated by the generate carry instruction in one of the plurality of store units as identified by the generate carry instruction.

11. The processor of claim 10 that also supports separately executable subtraction type and generate borrow instructions, wherein an instance of the generate borrow instruction indicates at least one of the store units to store an indication of a borrow condition that corresponds to an instance of the subtract type instruction.

12. The processor of claim 10 that supports parallel execution of the separately executable instructions.

13. The processor of claim 10 that decodes the separately executable instructions from a very long instruction word packet.

14. The processor of claim 1, wherein the store units include general registers.

15. An apparatus comprising:
a store unit; and
means for indicating a carry bit in the store unit responsive to execution of a first instruction that determines whether addition of operands will cause a carry condition separate from execution of a second instruction that adds the operands.

16. The apparatus of claim 10 further comprising means for indicating a borrow bit in the store unit responsive to execution of a third instruction that determines whether subtraction of operands will cause a borrow condition separate from execution of a fourth instruction that subtracts the operands.

17. The apparatus of claim 16 further comprising means for executing instances of the third and fourth instructions in parallel.

18. The apparatus of claim 10 further comprising means for performing instances of the first and second instructions in parallel.

19. The apparatus of claim 15 further comprising means for determining overflow with the second instruction.

20. A computer program product encoded on one or more machine-readable media, the computer program product comprising:
a generate carry instruction executable to generate a carry bit if addition of a set of operands causes a carry condition and that includes fields to indicate the set of operands and a destination for the carry bit; and
an addition type instruction executable to add a set of operands.

21. The computer program product of claim 20 wherein the generate carry instruction includes an opcode field, a plurality of source operand fields, and a destination field.

22. The computer program product of claim 20, wherein the instances of the generate carry and the addition type instructions are executable on separate processing units.

23. The computer program product of claim 20, wherein the instances of the generate carry and the addition type instructions are executable along separate paths in parallel.

24. The computer program product of claim 20 further comprising:
a generate borrow instruction executable to generate a borrow bit if subtraction of a set of operands causes a borrow condition and that includes fields to indicate the set of operands and a destination for the borrow bit; and
a subtraction type instruction executable to subtract a set of operands.

* * * * *